United States Patent
Bi et al.

(10) Patent No.: US 8,869,195 B2
(45) Date of Patent: Oct. 21, 2014

(54) APPARATUS AND METHOD FOR MANAGING VOICE COMMUNICATIONS

(75) Inventors: Haifeng Bi, San Antonio, TX (US); Xiaolian Bi, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 722 days.

(21) Appl. No.: 12/634,729

(22) Filed: Dec. 10, 2009

(65) Prior Publication Data

US 2011/0142215 A1 Jun. 16, 2011

(51) Int. Cl.
*H04N 7/10* (2006.01)
*H04N 7/025* (2006.01)
*H04L 29/06* (2006.01)
*H04N 21/4788* (2011.01)
*H04N 21/439* (2011.01)
*H04N 21/44* (2011.01)
*H04M 3/487* (2006.01)
*H04M 7/00* (2006.01)

(52) U.S. Cl.
CPC ....... *H04M 3/42513* (2013.01); *H04L 65/1069* (2013.01); *H04N 21/4788* (2013.01); *H04N 21/4394* (2013.01); *H04L 65/1036* (2013.01); *H04N 21/44008* (2013.01); *H04M 2201/38* (2013.01); *H04M 3/4878* (2013.01); *H04M 7/003* (2013.01); *H04L 65/1076* (2013.01)
USPC .................... 725/32; 725/34; 725/35; 725/36

(58) Field of Classification Search
None
See application file for complete search history.

(56) References Cited

U.S. PATENT DOCUMENTS

| | | | | |
|---|---|---|---|---|
| 5,410,326 A  * | 4/1995 | Goldstein | .................... | 348/734 |
| 7,174,191 B2 | 2/2007 | Doble | | |
| 7,552,174 B1 * | 6/2009 | Cramer et al. | ................ | 709/203 |
| 7,603,276 B2 | 10/2009 | Yoshizawa | | |
| 7,647,225 B2 | 1/2010 | Bennett | | |
| 2005/0198096 A1* | 9/2005 | Shaffer et al. | ................ | 709/200 |
| 2007/0157251 A1* | 7/2007 | Shrivastava et al. | ............ | 725/60 |
| 2008/0168489 A1* | 7/2008 | Schraga | ......................... | 725/32 |
| 2009/0083815 A1* | 3/2009 | McMaster et al. | ............ | 725/110 |
| 2009/0094637 A1* | 4/2009 | Lemmons | ....................... | 725/32 |
| 2009/0158318 A1* | 6/2009 | Levy | ............................... | 725/32 |
| 2009/0271834 A1* | 10/2009 | Asmussen | .................... | 725/106 |
| 2009/0291759 A1* | 11/2009 | Cox et al. | ........................ | 463/37 |
| 2010/0076848 A1* | 3/2010 | Stefanik et al. | ............ | 705/14.58 |
| 2011/0184735 A1 | 7/2011 | Flaks | | |
| 2011/0212737 A1 | 9/2011 | Isidore | | |

(Continued)

FOREIGN PATENT DOCUMENTS

EP 1014279 6/2000

*Primary Examiner* — Nasser Goodarzi
*Assistant Examiner* — Fred Peng
(74) *Attorney, Agent, or Firm* — Guntin & Gust, PLC; Jay H. Anderson (57) ABSTRACT

A system that incorporates teachings of the present disclosure may include, for example, a server having a controller to receive a call request from a set top box that is remote from the server where the call request identifies a telephone number that is displayed in video content presented by the set top box where the telephone number was detected based on at least one of image pattern recognition and voice recognition and where the telephone number is associated with a marketing entity of the video content, establish a voice communication with a first telephone device associated with the set top box, and establish the voice communication with a second telephone device associated with the telephone number and the marketing entity if the first telephone device accepts the voice communication. Other embodiments are disclosed.

20 Claims, 5 Drawing Sheets

(56) References Cited

U.S. PATENT DOCUMENTS

| | | |
|---|---|---|
| 2011/0213611 A1 | 9/2011 | Rauh |
| 2011/0283329 A1 | 11/2011 | Davis et al. |
| 2011/0321087 A1* | 12/2011 | Huber et al. ............ 725/34 |
| 2012/0083294 A1 | 4/2012 | Bray |
| 2012/0210430 A1 | 8/2012 | Boulanger |

* cited by examiner

APPARATUS AND METHOD FOR MANAGING VOICE COMMUNICATIONS

FIELD OF THE DISCLOSURE

The present disclosure relates generally to communication systems and more specifically to an apparatus and method for managing voice communications.

BACKGROUND

Marketing efforts often provide telephone contact information shown during video content. Viewers can call the telephone number to make a purchase or otherwise participate in the marketing effort that has been shown.

DETAILED DESCRIPTION

One embodiment of the present disclosure can entail a computer-readable storage medium operating in a set top box, where the storage medium comprises computer instructions to present video content at a display device, determine a telephone number that is displayed in the video content at the display device using image pattern recognition, present an option to establish voice communication with a marketing entity associated with the video content, receive an input from a remote controller associated with the set top box in response to the presentation of the option, and transmit a call request to a remote server when the input is received, wherein the voice communication is established between a first telephone device associated with the set top box and a second telephone device associated with the marketing entity based on the call request and the determined telephone number.

Another embodiment of the present disclosure can entail a server having a controller to receive a call request from a set top box that is remote from the server, wherein the call request identifies a telephone number that is displayed in video content presented by the set top box, wherein the telephone number was detected based on at least one of image pattern recognition and voice recognition, wherein the telephone number is associated with a marketing entity of the video content, establish a voice communication with a first telephone device associated with the set top box, establish the voice communication with a second telephone device associated with the telephone number of the marketing entity if the first telephone device accepts the voice communication.

Yet another embodiment of the present disclosure can entail a method including presenting video content at a display device, determining a telephone number that is displayed in the video content at the display device using image pattern recognition, and transmitting a call request to a remote server based on the telephone number, wherein a Voice over Internet Protocol (VoIP) communication is established between a first telephone device associated with the set top box and a second telephone device associated with a marketing entity of the video content based on the call request and the determined telephone number.

Figure 1:
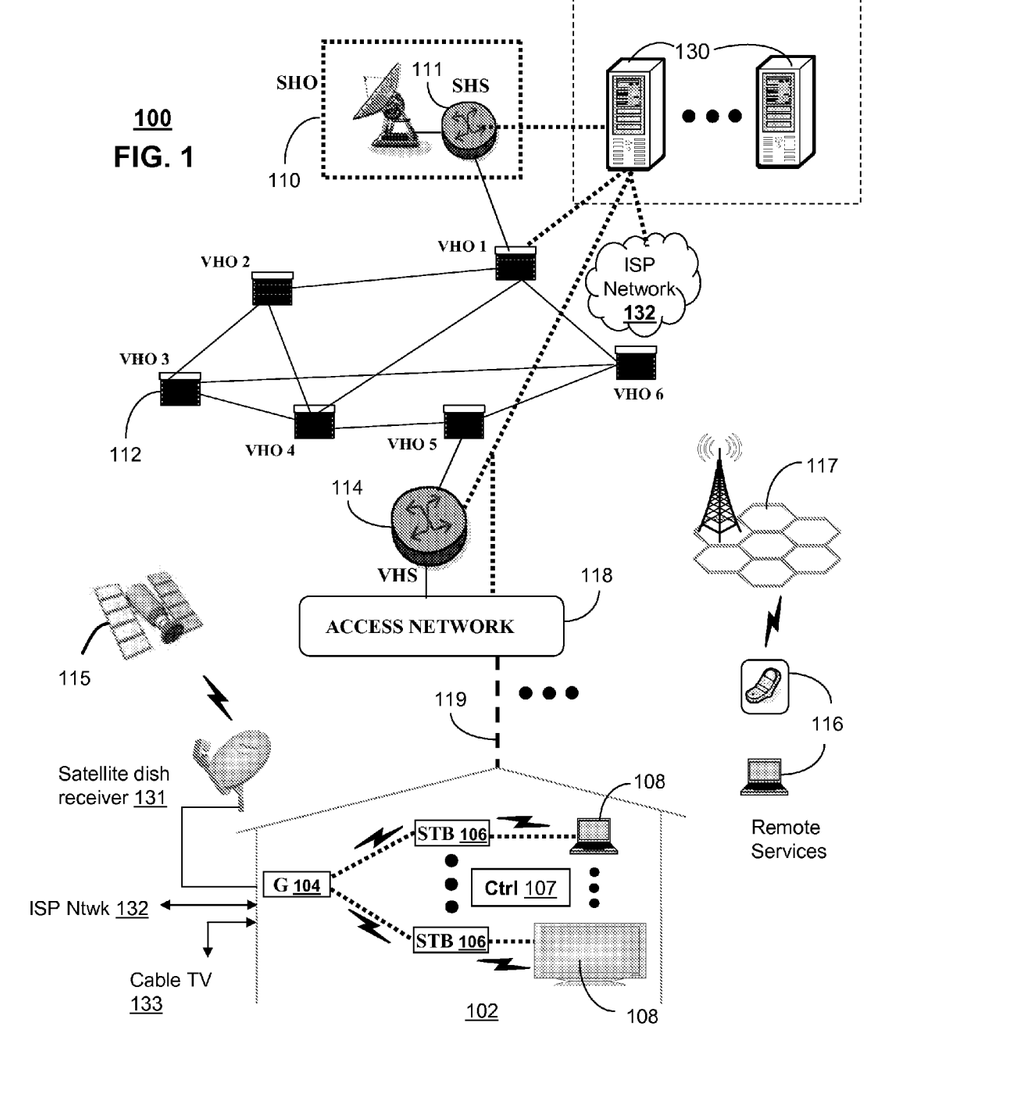
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the servers 130 can be utilized for establishing first and second legs of a call based on a telephone number displayed during media broadcast or other media content. For example, an STB can have pattern recognition algorithms running constantly or otherwise in the background scanning the contents of each video frame that is displayed on the TV. When a valid phone number is displayed on the TV, through the use of the remote control, the user can click on the phone number, and transmit a signal to the STB indicating the desire to dial that phone number. The STB then communicates to the servers 130 such as through the broadband gateway. A VoIP (voice over IP) call is then initiated by the servers 130. The first leg of the call can be made to the caller's designated phone in the home. When the user picks up the phone, the network then initiates the second leg of the call to the number dialed. If the number dialed is on the public wireline or wireless telephone network, the call can go through a VoIP gateway in the service provider's VoIP network before being handed to the public wireline or wireless network. When the party at the dialed number answers the call, the VoIP network can bridge the two legs of the call, and an end-to-end call is successfully established.

Figure 2:
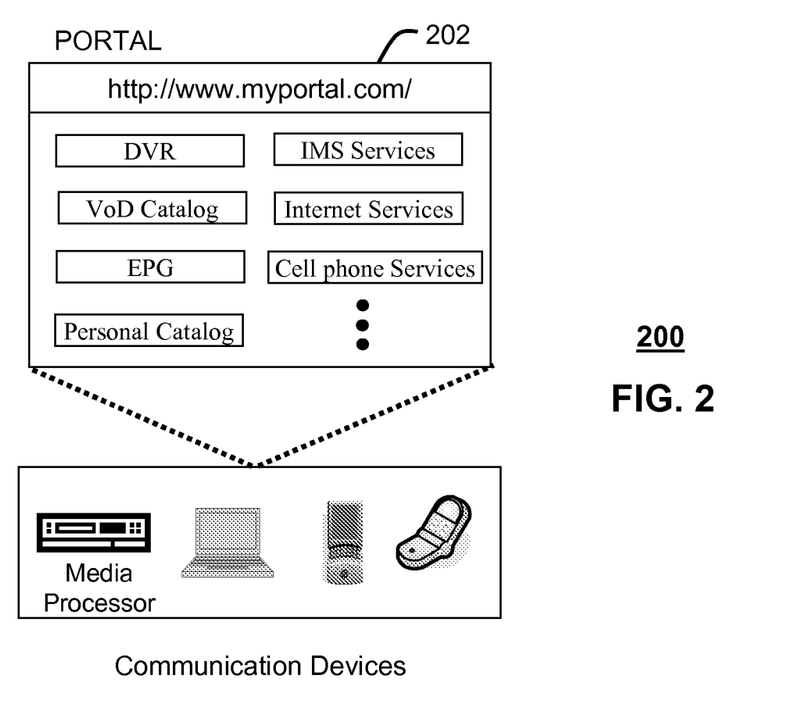
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
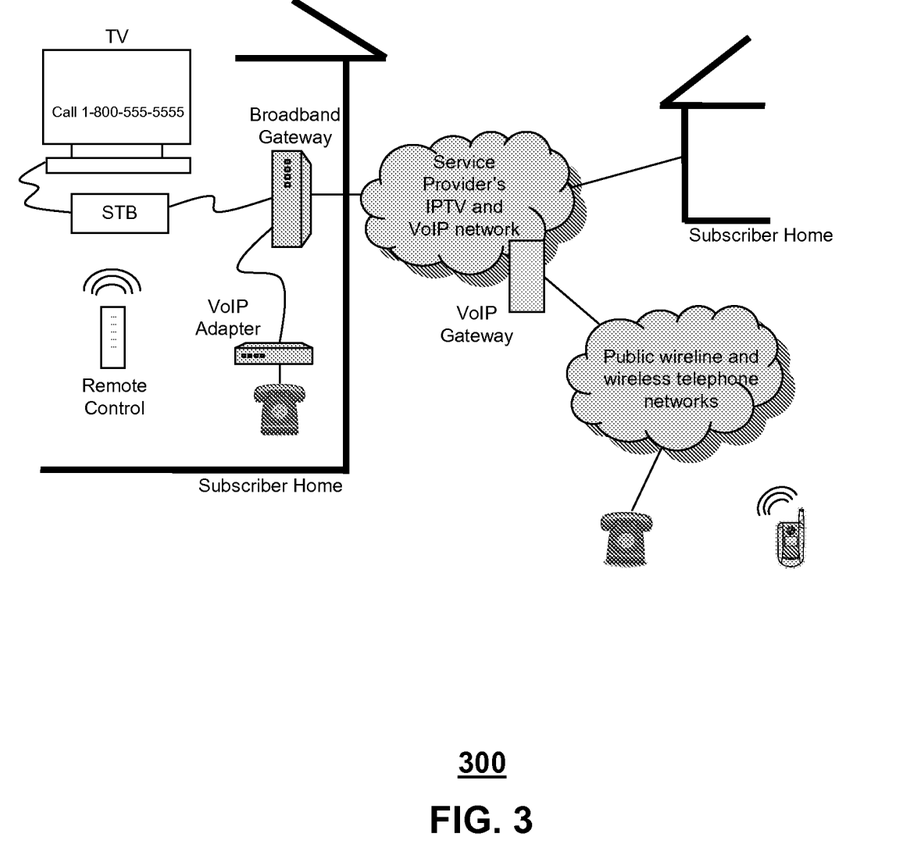
FIG. 3 depicts an illustrative embodiment of a communication system that provides media services.

FIG. 3 depicts an exemplary embodiment of a communication system 300 for delivering media content. Communication system 300 can be overlaid or operably coupled with communication system 100 as another representative embodiment of said communication systems. System 300 can include residences or other subscriber locations where an STB presents media content on a display device, such as a TV. Various devices can be utilized for communicating and managing the media services that are presented at the residence, including gateways, DSLAMs and so forth. In one embodiment, the system can provide for delivery of media content as well as establishing VoIP communications, such as through a VoIP adapter that connects a telephone to the broadband gateway.

System 300 can utilize various communication protocols and components. For instance, the system 300 can provide for IPTV media services in combination with VoIP services over a network that connects a plurality of the residences or other user locations (including business locations). In another embodiment, the subscriber IPTV/VoIP network can be coupled to a public wireline and wireless telephone network. The system 300 can allow for telephone communication (e.g., VoIP calls) to be established between residences and entities that are advertising or otherwise marketing in video content that is being presented to the users.

The STBs can be provided with pattern-recognition capability, such as through software downloads or the like, which can run in the background. For example, the software download can be a remote, in-field, firmware upgrade to the STBs via a service provider's network. In one embodiment, the pattern recognition can run constantly so that any advertisements can be monitored. In another embodiment, the pattern recognition can be selectively implemented, including according to a user's choice (such as in a user profile) or according to a service provider's choice, (such as based on selected media content or a user's service plan). The pattern recognition, can be adjusted based on the particular location of the STB, such as for North American application, the software recognition components can look for 10 or 11 digit E.164 phone numbers that are displayed on the TV in all possible formats, e.g. 1-800-555-5555, 1 (800) 555-5555, (800) 555-5555 and so forth. In one embodiment, the pattern recognition components can also look for valid seven digit phone numbers which can then be combined with the viewer's area code, such as pre-stored in the STB.

The STB can display calling choices on the TV to the viewer when one or more telephone numbers are detected on the screen. The STB can receive a viewer's response through the remote control and relay such a response to the network to initiate the call.

Figure 4:
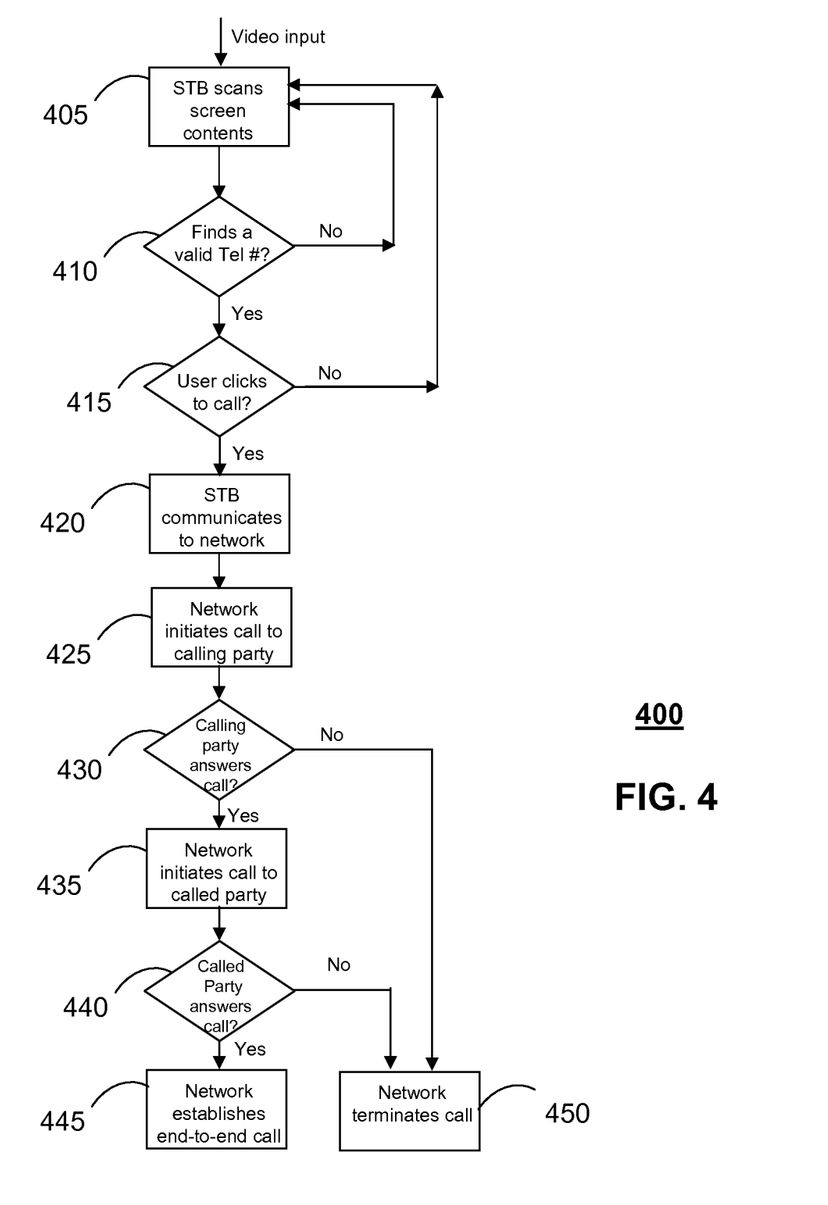
FIG. 4 depicts an illustrative embodiment of a method operating in portions of the communication systems of FIGS. 1 and 3.

FIG. 4 depicts an illustrative method 400 operating in portions of communication systems 100 and 300. Method 400 can begin with step 405 in which the STB scans the screen for a telephone number that is associated with advertising or other marketing efforts. For instance, the TV can be displaying a phone number to call, such as "To order, call 1-800-555-5555 now." The pattern recognition software on the STB can be continuously scanning each screen display (e.g., each video frame or select video frames) and can detect a pattern that matches a valid phone number as in step 410. The STB can convert the detected pattern to text, i.e. 1-800-555-5555. The STB can present a calling option on the TV to the viewer. The presentation of the calling option can be of a number of different formats, e.g. an overlay text bar at the bottom of the TV screen which displays "Press OK on your remote control to dial this number: 1-800-555-5555; Press Exit to cancel."

In step 415, if the user decides to call this number, he or she can press the "OK" button on the STB remote control or otherwise send a signal to the STB through the remote or through another device in communication with the STB. If the user does not want to call, he can press the "Exit" button to remove the overlay text bar, and/or wait for a time-out when the STB stops displaying the overlay text bar. In step 420, if the user desires to place the call then the STB can either initiate the call or forward this information to a communication server in the Service Provider network which then initiates the call.

In step 425, the server or other component of the service provider's network can initiate the call to the calling party (e.g., the user). This action can cause the user's phone number to be rung, for example, a POTS phone, a VOIP phone, and/or a cell phone. The selection of the phone or phone's to be rung can be pre-determined, such as based on a user profile. If the user answers the ringing phone in step 430 then the off-hook condition can allow the service provider's network to ring the desired telephone number, in this case 1-800-555-5555, in step 435.

If the call to the desired telephone number is answered by the called party in step 440 (such as the marketing entity at 1-800-555-5555), the telephone call is established, connecting the viewer with the marketing entity in step 445. If calling party does not answer the ring or if the called party does not answer the ring then the call is terminated as in step 450.

In one embodiment, if a plurality of phone numbers are detected on the screen then a message can be displayed in the overlay text bar such as "Press OK on your remote control to dial phone numbers on the screen; Press Exit to cancel." If the user presses OK, then the STB can display a menu on the TV screen, listing the phone numbers that it has detected from the screen. At that point, the user can use the remote control to enter "1", "2", etc. to dial a selected phone number in the list. Then the menu on the screen disappears. If the viewer presses "Exit", the overlay text display can disappear.

Upon reviewing the aforementioned embodiments, it would be evident to an artisan with ordinary skill in the art that said embodiments can be modified, reduced, or enhanced without departing from the scope and spirit of the claims described below.

For example, the STB can utilize voice recognition in combination with, or in place, of video pattern recognition to determine telephone numbers that can be called. For instance, a telephone number that is recited by a host during the advertising or other video content, such as by a host in a telethon, can be detected and the option for calling from the STB can be presented to the viewer. The particular method for presenting the option to call the marketing entity can vary. For instance, overlays, semi-transparent overlays and/or audio messages can be presented to the viewer.

In another embodiment, the option to call the marketing entity can be intentionally delayed. For example, the option to call the marketing entity can be presented at a different communication device, such as at the viewer's mobile device, at a later time so that the viewer does not need to interrupt his or her viewing experience. The timing of the presentation of the option and/or the GUI used for the option can be determined based on a number of factors, including monitored user behavior, a user profile and so forth.

In one embodiment, the media content can have metadata and/or metadata pointers embedded therein for facilitating establishing the telephone call to the marketing entity that is associated with the video content. For example, the video content can include metadata pointers that point to data stored remotely which provides alternative telephone numbers for establishing voice communication between the viewer and the marketing entity. In one embodiment, if the called party does not answer the telephone call then the metadata pointers can be used to place a call using the alternative telephone number.

In another embodiment, the capability to automatically establish voice communications with marketing entities associated with video content through image and/or voice recognition of telephone numbers presented during the video content can be restricted by the service provider, such as to particular channels or particular types of media content.

Other suitable modifications can be applied to the present disclosure without departing from the scope of the claims below. Accordingly, the reader is directed to the claims section for a fuller understanding of the breadth and scope of the present disclosure.

Figure 5:
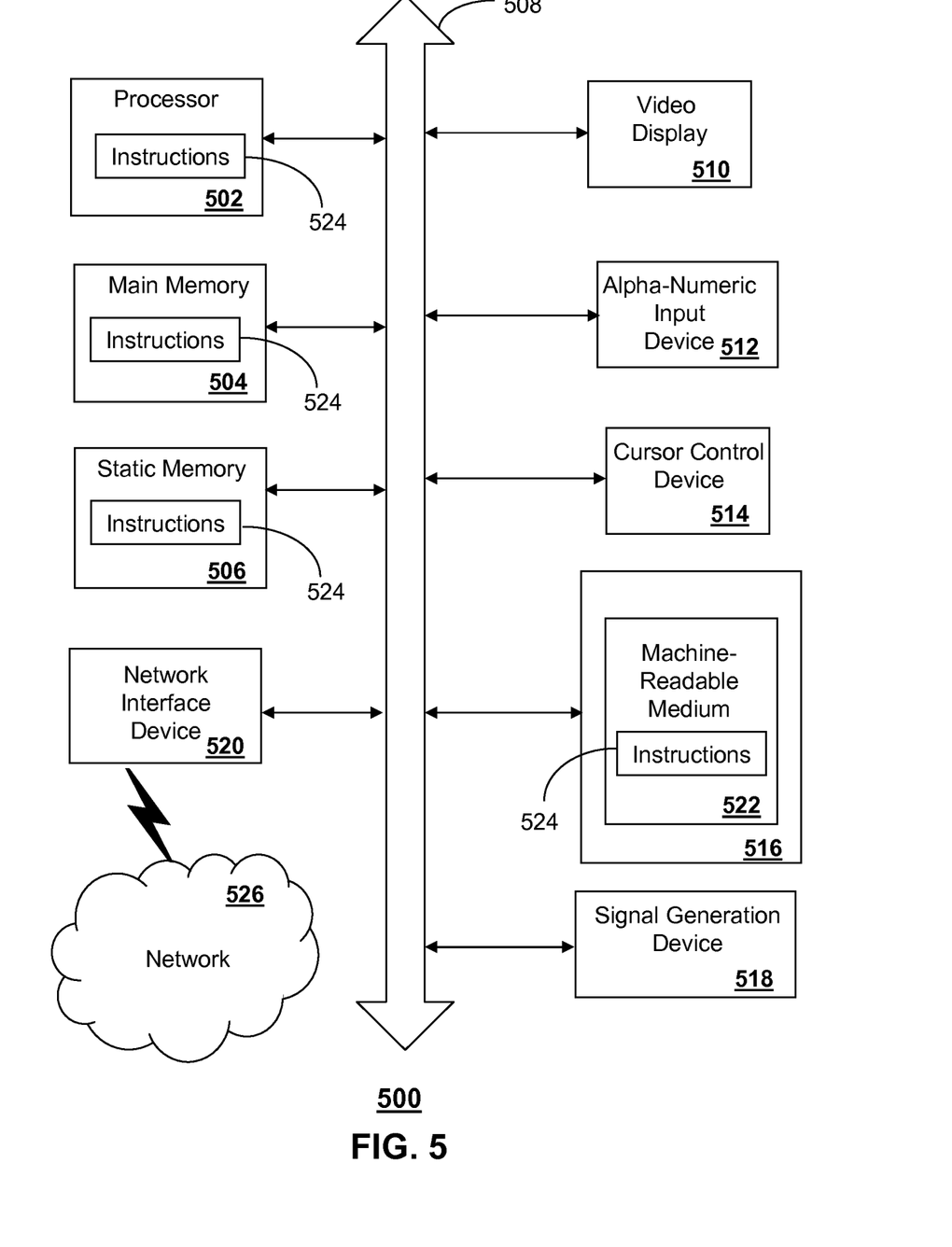
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions which, responsive to being executed by a processor of a set top box, cause the processor to perform operations comprising:
    presenting, by the set top box, video content at a display device;
    determining, by the set top box, a primary telephone number displayed in the video content at the display device using image pattern recognition;
    determining, by the set top box, an alternative telephone number based on a metadata pointer embedded in the video content;
    presenting, by the set top box, an option to establish voice communication with a marketing entity associated with the video content;
    receiving, by the set top box, an input from a remote controller associated with the set top box in response to the presentation of the option;
    transmitting, by the set top box, a first call request to a remote server responsive to the input being received, requesting the voice communication be established between a first telephone device associated with the set top box and a second telephone device associated with the marketing entity based on the first call request and the primary telephone number; and
    transmitting, by the set top box, a second call request to establish communication between the first telephone device and a communication device associated with the marketing entity based on the second call request and the alternative telephone number if voice communication is not established in accordance with the first call request.

2. The non-transitory computer-readable storage medium of claim 1, wherein the first telephone device receives a first call from the remote server prior to the voice communication being established.

3. The non-transitory computer-readable storage medium of claim 1, comprising computer instructions to determine an area code associated with the primary telephone number.

4. The non-transitory computer-readable storage medium of claim 1, wherein the voice communication is based on a voice over internet protocol.

5. The non-transitory computer-readable storage medium of claim 1, comprising computer instructions to present the option delayed with respect to display of the video content, based on a user profile associated with the set top box.

6. The non-transitory computer-readable storage medium of claim 1, wherein the option is presented as an overlay.

7. The non-transitory computer-readable storage medium of claim 6, wherein the overlay is semi-transparent.

8. A system comprising:
    a memory to store computer instructions; and
    a controller coupled with the memory, wherein the controller, responsive to executing the computer instructions, performs operations comprising:
        receiving a first call request from a set top box that is remote from the controller, wherein the first call request identifies a primary telephone number displayed in video content presented by the set top box, wherein the primary telephone number was detected based on image pattern recognition or voice recognition performed by the set top box, wherein the primary telephone number is associated with a marketing entity of the video content;

facilitating establishing a voice communication with a first telephone device associated with the set top box;

facilitating establishing the voice communication with a second telephone device associated with the primary telephone number and the marketing entity if the first telephone device accepts the voice communication; and receiving a second call request from the set top box if the voice communication with the second telephone device is not established, wherein the second call request identifies an alternative telephone number based on a metadata pointer embedded in the video content.

9. The system of claim 8, wherein the voice communication is according to a voice over internet protocol.

10. A method comprising:

presenting, by a set top box, video content at a display device;

determining, by the set top box, a primary telephone number that is displayed in the video content at the display device using image pattern recognition;

determining, by the set top box, an alternative telephone number based on a metadata pointer embedded in the video content;

transmitting, by the set top box, a first call request to a remote server based on the primary telephone number, requesting a voice over internet communication be established between a first telephone device associated with the set top box and a second telephone device associated with a marketing entity of the video content based on the first call request and the primary telephone number; and transmitting, by the set top box, a second call request to establish communication between the first telephone device and a communication device associated with the marketing entity based on the second call request and the alternative telephone number if the voice over internet protocol communication is not established in accordance with the first call request.

11. The method of claim 10, comprising presenting an option on the display device to establish the voice over internet protocol communication.

12. The method of claim 11, comprising receiving an input from a remote controller associated with the set top box in response to the presentation of the option.

13. The method of claim 10, comprising establishing the voice over internet protocol communication with the second telephone device if the first telephone device accepts the voice over internet protocol communication.

14. The method of claim 11, wherein the option is presented as an overlay with the video content.

15. The method of claim 11, comprising transmitting the option to an other communication device associated with the set top box.

16. The method of claim 15, wherein the other communication device is a mobile phone.

17. The method of claim 10, comprising determining an area code associated with the primary telephone number.

18. The method of claim 10, comprising presenting an option on the display device to establish the voice over internet protocol communication, wherein a graphical user interface for the option is based on a user profile associated with the set top box.

19. The method of claim 11, further comprising presenting the option delayed with respect to display of the video content, based on a user profile associated with the set top box.

20. The method of claim 18, further comprising presenting the graphical user interface delayed with respect to display of the video content, based on the user profile.

* * * * *